United States Patent [19]

Stoughton

[11] Patent Number: 4,769,708
[45] Date of Patent: Sep. 6, 1988

[54] MANUAL AND AUTOMATIC AMBIENT LIGHT SENSITIVE PICTURE CONTROL FOR A TELEVISION RECEIVER

[75] Inventor: John W. Stoughton, Indianapolis, Ind.

[73] Assignee: RCA Licensing Corporation, Princeton, N.J.

[21] Appl. No.: 41,568

[22] Filed: Apr. 23, 1987

[51] Int. Cl.$^4$ .............................................. H04N 5/58
[52] U.S. Cl. ..................................... 358/161; 358/169
[58] Field of Search ................ 358/161, 168, 169, 174

[56] References Cited

U.S. PATENT DOCUMENTS

| | | | |
|---|---|---|---|
| 3,961,281 | 6/1976 | Woolling | 330/129 |
| 4,451,849 | 5/1984 | Fuhrer | 358/161 |
| 4,511,921 | 4/1985 | Harlan et al. | 358/161 |

OTHER PUBLICATIONS

Article "Color TV Receiver Equipped with Microprocessor Control"-W. Baum *Funkschaw*, 1977, pp. 763-768.

*Primary Examiner*—James J. Groody
*Assistant Examiner*—David E. Harvey
*Attorney, Agent, or Firm*—Paul J. Rasmussen; Peter M. Emanuel; Ronald H. Kurdyla

[57] ABSTRACT

In a television receiver, a contrast control signal for controlling the amplitude of a video signal is a function of a manual contrast control component provided by a viewer, and an automatic contrast control component provided by a light sensitive circuit responsive to ambient light conditions. A "soft" limiter limits the value of the extinguished due to excessive video signal attenuation in response to the control signal. The manual control component is provided by means including a duty cycle control device such as a binary rate multiplier or pulse width modulator.

6 Claims, 3 Drawing Sheets

MANUAL AND AUTOMATIC AMBIENT LIGHT SENSITIVE PICTURE CONTROL FOR A TELEVISION RECEIVER

This invention concerns image contrast control apparatus for controlling the magnitude of a video signal both manually and automatically in response to ambient light.

A video signal processing and display system such as a television receiver commonly includes a viewer adjustable device (e.g., a potentiometer or a remote control unit) for manually controlling the peak-to-peak amplitude of a video signal to achieve a desired level of contrast for a picture displayed by an image reproducing kinescope of the system. Some video display systems also include apparatus for automatically controlling picture contrast as a function of ambient light conditions in the environment in which the displayed picture is being viewed. This is typically accomplished by means of a light sensitive variable conduction device, such as a light dependent resistor (LDR) or equivalent device, positioned close enough to the face of the kinescope display screen so that the amount of ambient light striking the LDR is proportional to the amount of light striking the kinescope display screen. The impedance of the LDR typically varies inversely with the level of ambient light so that picture contrast increases and decreases as the ambient light level increases and decreases, respectively.

Digital control systems are often advantageously used in a television receiver, e.g., for the purpose of contrast control, even though the receiver does not employ digital video signal processing. Digital control systems can be implemented in a variety of ways, such as by means of a digital to analog converter (DAC) comprising a binary rate multiplier (BRM), e.g., the type CD4089B BRM commercially available from the Solid State Division of RCA Corporation or the type SN5497 BRM commercially available from Texas Instruments Corporation, or a pulse width modulator (PWM). A BRM or a pulse width modulator generate a pulse signal in response to a digital word representing a control level. The pulse signal is filtered to produce a DC control signal. The average value of the pulse signal is changed by changing the duty cycle of the pulse signal. In the case of a BRM the number of pulses per unit of time is changed, and in the case of a PWM the pulse width is changed.

Such DAC controls are useful devices for controlling the amplitude of a video signal such as for the purpose of contrast control (sometimes referred to as picture control). They advantageously avoid the need for relatively expensive potentiometers and offer repeatable performance. In addition, factory preset adjustments can be readily and inexpensively implemented simply by programming memory locations associated with a certain function with desired values.

It is herein recognized that, in a system including provision for contrast control in response to ambient light conditions, circumstances can be such that the coaction of the manual contrast control setting and contrast control as a function of ambient light will attenuate the video signal so as to almost or completely extinguish a displayed image. This may happen, for example, when the viewer operated manual contrast control is below a maximum setting in a condition of low ambient light. This situation is disturbing and may lead a viewer to believe that the receiver is inoperative, leading to an unnecessary service call.

The last mentioned situation has been observed, for example, in the case of an ambient light responsive contrast control system employing a DAC. In such case a wide operating range of the DAC, while desirable from the standpoint of contrast control, may be so wide as to cause the displayed picture to be extinguished when the DAC operates near the lower end of its control range in the presence of low ambient light conditions. Restricting the operating range is undesirable as it can lead to unacceptable reduction of contrast control resolution.

Accordingly, pursuant to the principles of the present invention there is disclosed herein an ambient light responsive contrast control system including a limiter for limiting a contrast control voltage to prevent a displayed image from being extinguished due to excessive video signal attenuation. In a disclosed preferred embodiment of the invention, a "soft" limiter is employed to permit some degree of contrast control after the limiter threshold is reached, and to reduce the likelihood that a viewer will notice the operation of the limiter.

Figure 1:
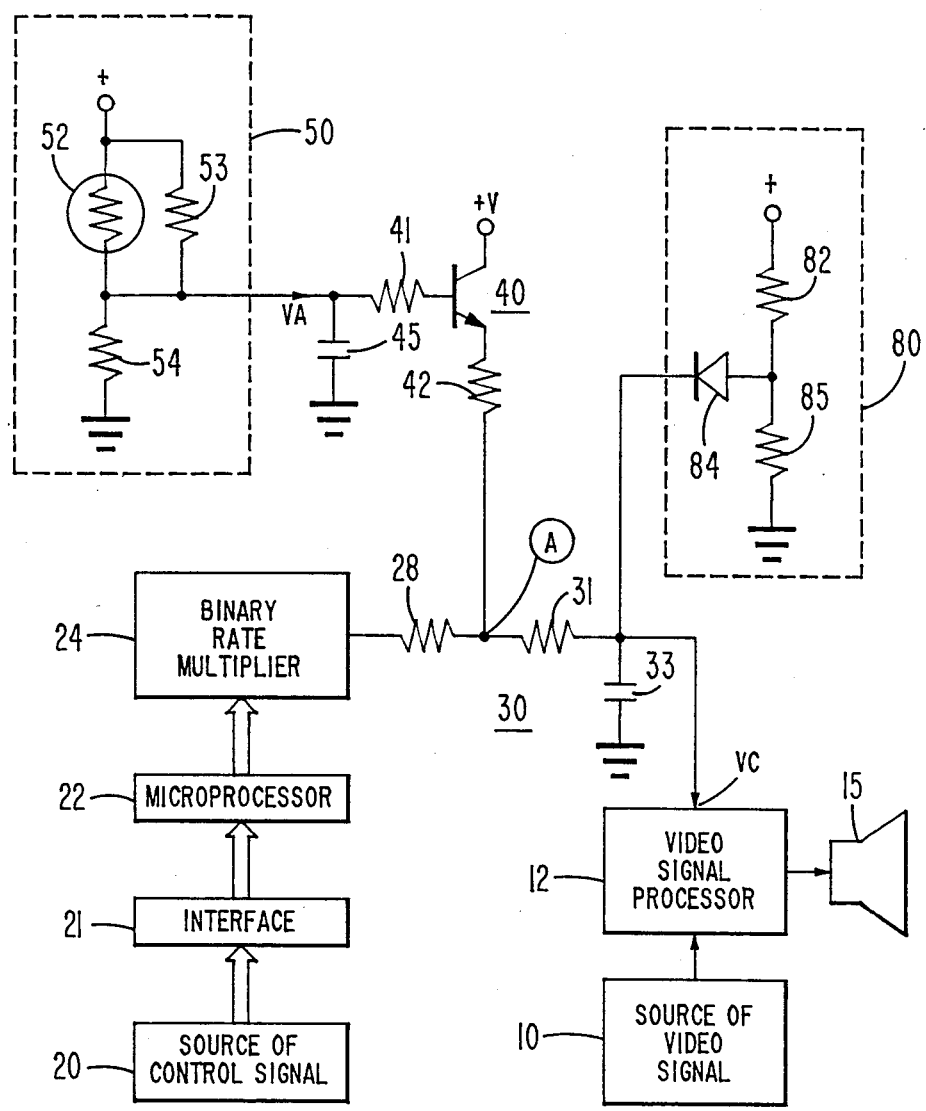
FIG. 1 shows a portion of a television receiver video signal processing system including contrast control apparatus in accordance with the present invention.

In FIG. 1, a video signal is provided from a source 10 to a video signal processor 12 which amplifies the video signal to a magnitude suitable for driving an image displaying kinescope 15. The peak-to-peak amplitude of the video signal, and hence the contrast of a displayed image, is ultimately controlled in response to a control signal from a source 20. In this example source 20 constitutes part of a viewer operated remote control unit. In response to a viewer selected contrast level, source 20 transmits a coded signal in binary form which is received by an interface unit 21 attached to the receiver. When source 20 is an infrared remote control unit for example, interface 21 translates the received binary infrared signal into a binary electrical signal suitable for processing by a microprocessor 22. Interface unit 21 formats the received binary signal into a serial or parallel binary signal containing coded information which provides microprocessor 22 with suitable instructions for incrementing or decrementing the digital word stored in memory associated with the contrast function.

Microprocessor 22 provides a binary signal output to a binary rate multiplier (BRM) 24 of known configuration, as will be discussed in greater detail subsequently. A binary output signal from BRM 24 is conveyed via a resistor 28 and an integrating or low pass filter network 30 including a resistor 31 and a filter capacitor 33. The output signal from BRM 24 comprises substantially constant amplitude pulses with a pulse width (duty factor) determined by the contrast control information supplied from microprocessor 22. The duty factor of the pulse signal produced by BRM 24 determines the DC voltage produced across capacitor 33 when the output pulse signal of BRM 24 is integrated by circuit 30. This DC voltage is applied to a contrast control (gain control) input of video processor 12 to control the magnitude of the video signal, and thereby to control the contrast of a reproduced image.

Resistor 28 limits the output current of BRM 24, and also acts as a lower range limiting device for a given ambient light condition. The value of resistor 31 is chosen to provide appropriate low pass filtering of the BRM output signal, in combination with capacitor 33. The charge and discharge time constants of capacitor 33 are primarily determined by the value of resistor 31. The value of resistor 28 also influences the discharge time constant. The charging time constant of capacitor 33 as determined by the values of resistors 31 and 42, and the discharging time constant as determined by the values of resistors 28 and 31, preferably should be substantially equal or within 10% of each other. This typically requires that the value of resistor 31 be significantly larger than the values of resistors 28 and 42.

Auxiliary contrast (gain) control in response to ambient lighting conditions is provided by a network including a voltage source 50, a filter capacitor 45, a resistor 41, an emitter follower transistor 40, and a pull-up resistor 42. Source 50 includes a variable impedance network with an ambient light responsive light dependent resistor (LDR) 52 and resistors 53 and 54 arranged as a voltage divider between a source of positive DC operating potential (+) and ground reference potential. LDR 52 is positioned close to the display screen of kinescope 15 so that the amount of ambient light striking LDR 52 is proportional to the amount of light striking the kinescope display screen.

An auxiliary contrast control voltage VA from source 50 varies in accordance with the impedance of LDR 52, which in turn varies with the intensity of ambient light. Control voltage VA is conveyed via resistor 41, follower transistor 40 and resistor 42 to a node A at which the BRM output signal appears. Control voltage VA modifies the DC value associated with the BRM output signal at node A in response to ambient lighting conditions, thereby providing an auxiliary means of controlling the contrast of a displayed image in response to ambient lighting conditions.

The value of resistor 53 is selected to control the amount of change in image contrast that is produced for a given change in the resistance of LDR 52. Specifically, resistor 53 desensitizes LDR 52 so that with resistor 53 a smaller change in contrast is produced for a given change in ambient light intensity than without resistor 53, and so that unit-to-unit variations in LDR characteristics are less noticeable. Resistor 42 is a pull-up resistor for the output of BRM 24, and is connected between node A and the low impedance emitter of transistor 40, which represents both a low impedance source of pull-up voltage for BRM 24 and a source of auxiliary contrast control voltage.

Figure 2:
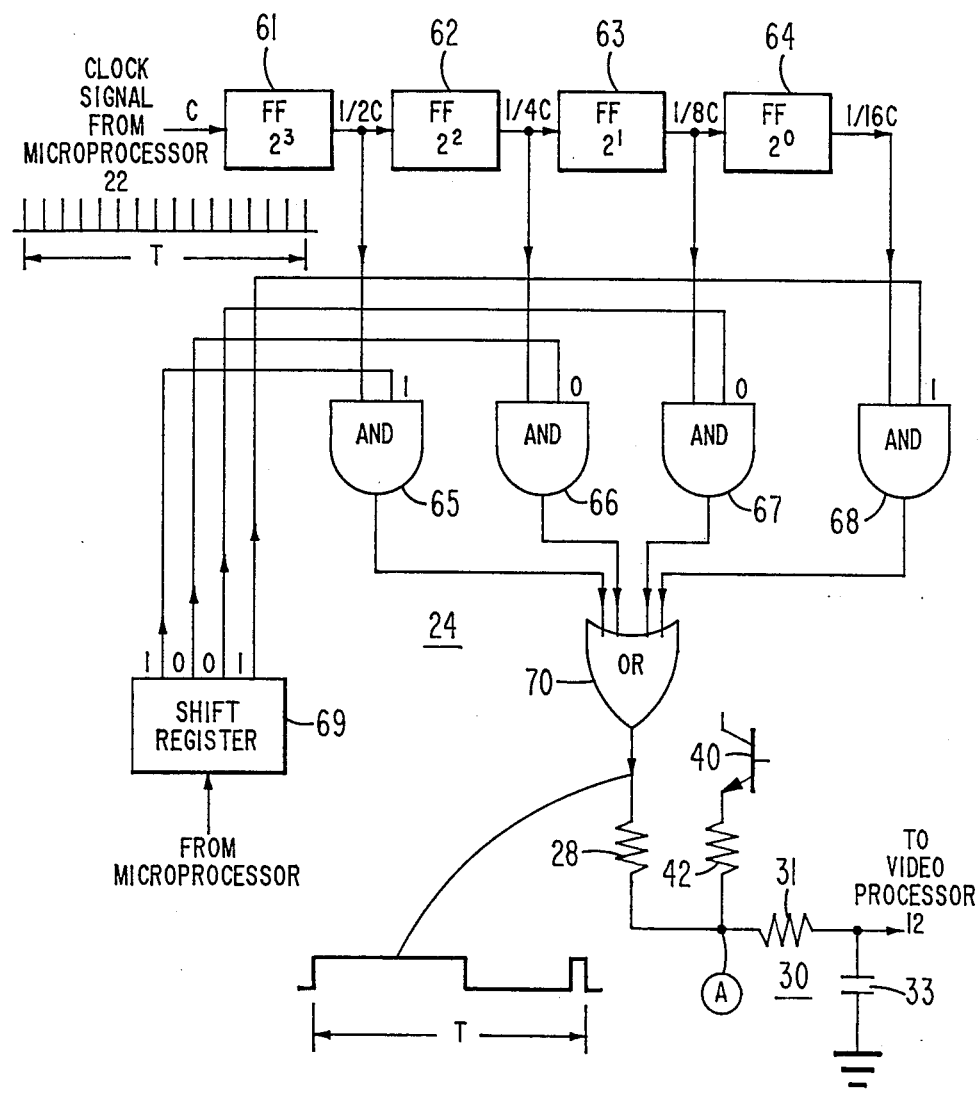
FIG. 2 shows circuit details of a portion of the apparatus of FIG. 1.

FIG. 2 shows additional details of BRM 24 in FIG. 1.

In FIG. 2 a periodic clock timing signal C (e.g., 1 MHz) from microprocessor 22 is applied to an input of a divide-by-two flip-flop 61 which is cascaded with similar flip-flops 62–64. As indicated by the input waveform, clock signal C comprises a series of sixteen periodic pulses within an illustrative interval T. Frequency divided versions of clock signal C are coupled from outputs of flip-flops 61–64 to respective first inputs of AND logic gates 65, 66, 67 and 68. Respective second inputs of AND gates 65–68 receive a binary signal from respective outputs of a shift register 69. The binary signals from the outputs of shift register 69 represent a contrast control signal (1001) as provided by microprocessor 22 in response to a contrast control command received from contrast control source 20 in FIG. 1.

Binary output signals from gates 65–68 are coupled to respective inputs of an OR logic gate 70. A binary output signal from OR gate 70, produced in response to the illustrated binary contrast control signal (1001), is indicated by the waveform. Compared to periodic clock signal C, the output signal from OR gate 70 constitutes a uniform amplitude pulse signal with a duty factor determined by the binary contrast control signal from shift register 69. The output signal from OR gate 70 represents a DC component which is a function of the contrast control information in the binary signal from shift register 69, as modified at node A by auxiliary contrast control DC information related to ambient light conditions as explained earlier. The DC value of the signal at node A is recovered for contrast control purposes by means of integrator 30. The output signal of BRM 24, when integrated over time by circuit 30, provides a DC voltage across capacitor 33 in accordance with the expression $$\frac{N}{2^n} \times VP$$

where "N" is the output number of the BRM (the number of pulses per unit of time), "n" is the number of binary bit stages of the BRM (four in this example), and "VP" is the magnitude of the pull-up voltage at the emitter of transistor 40. N can vary between 0 and $2^n$, or between 0 and 16 in the case of illustrated 4-bit BRM 24. BRM 24 provides an output pulse rate that is clock-input-pulse rate multiplied by 1/16 times the binary input. For example, when the binary input number (from shift register 69 via microprocessor 22) is 13, there will be 13 output pulses for every 16 input pulses. For additional information in this regard see the technical data sheet for the type CD4089B binary rate multiplier, commercially available from the Solid State Division of RCA Corporation.

The information content of the binary output signal of shift register 69 remains unchanged until a contrast change command is made by the viewer. Thus for a given contrast control setting the binary output signal (e.g., 1001) of register 69 appears continuously and is ultimately converted to a corresponding DC contrast control voltage by integrator 30. When the viewer initiates a contrast change, microprocessor 22 provides new contrast information to register 69 such that a new binary output signal appears (e.g., 1101) and remains until the next contrast control change is made.

A change in the pull-up voltage (at the emitter of transistor 40) due to an ambient light variation advantageously produces a predictable corresponding contrast change for any given BRM output signal. For example, a 50% change in the magnitude of the pull-up voltage will produce a 50% change in image contrast regardless of the form (i.e., duty cycle) of the BRM output signal.

Referring again to FIG. 1, in accordance with the principles of the present invention a limiter circuit 80 is included in the contrast control system. Limiter 80 includes voltage divider resistors 82 and 84 coupled between a source of positive DC potential and ground. A normally nonconductive limiter diode 85 is connected as shown between the junction of resistors 82 and 84 and the terminal of capacitor 33 at which the gain control voltage is developed. A desired threshold operating condition of diode 85 is established by a bias voltage applied to the anode of diode 85 from the junction of resistors 82 and 84. As will be discussed, limiter diode is rendered conductive when the voltage across capacitor 33 decreases sufficiently in a direction related to reduced image contrast. When conductive, diode 85 limits the voltage across capacitor 33 to a value related to the DC voltage appearing at the junction of resistor 82 and 84 less the offset voltage drop across diode 85, as will be explained in connection with FIG. 3.

Figure 3:
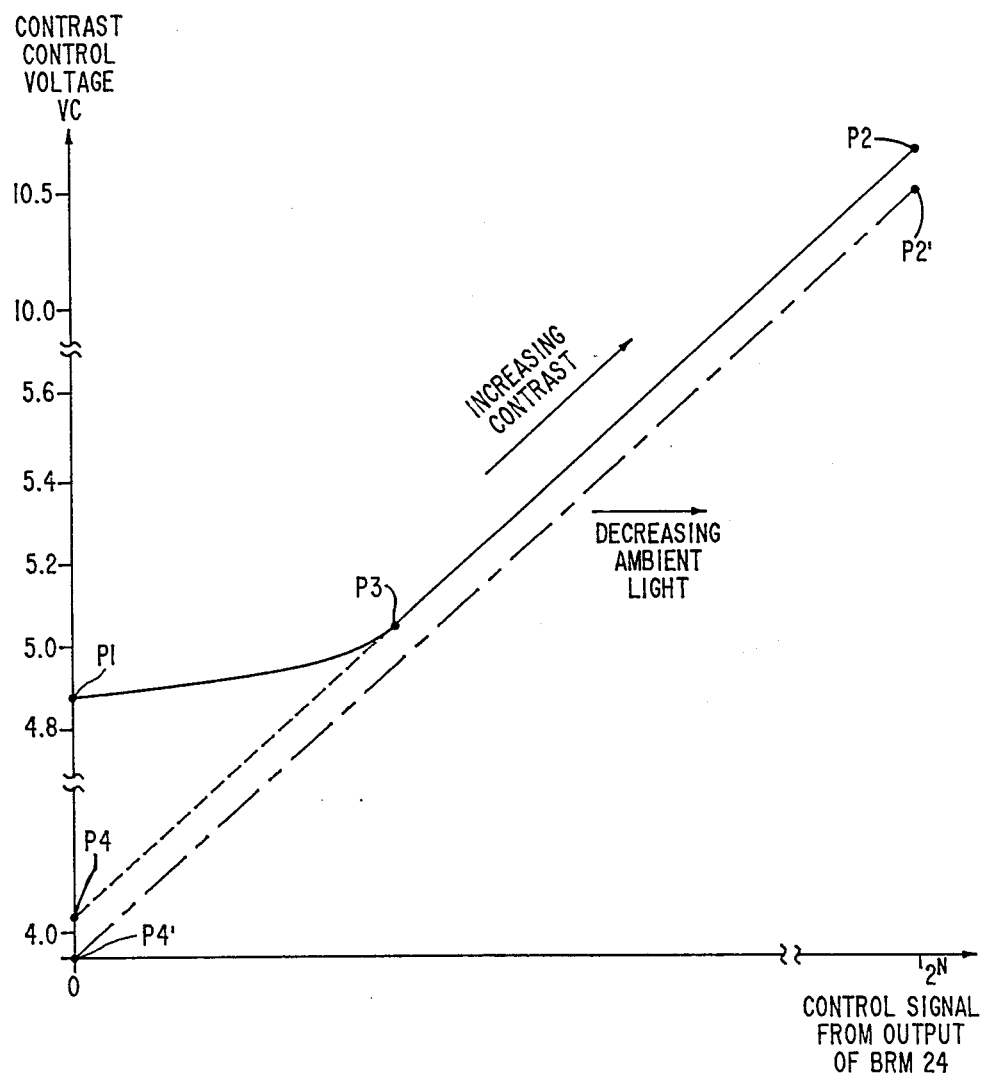
FIG. 3 illustrates the control characteristic of the contrast control apparatus of FIG. 1.

The contrast response characteristic of FIG. 3 depicts the relationship between the control signal from the output of BRM 24 and contrast control voltage VC as applied to video signal processor 12. The control signal from BRM 24 is depicted in terms of the BRM output number, i.e., the number of "steps" in the output signal of BRM 24 from 0 to $2^n$. The contrast response characteristic encompasses a point P1 at which minimum contrast is developed, a point P2 at which maximum contrast is developed, and an intermediate point P3.

Between points P3 and P2 the contrast response exhibits a first substantially linear characteristic with a non-zero rate of change of approximately unity (1:1) in this example. Between points P3 and P1 the contrast response exhibits a second substantially linear characteristic with a different (flatter) nonzero rate of change. The response between points P3 and P1 is due to the "soft" limiting action of limiter circuit 80, as will be discussed. The soft limiting region commences at point P3 when limiter diode 85 conducts in response to the control voltage appearing across capacitor 33 as explained previously. The dashed line between point P3 and P4 represents a continuation of the response characteristic between points P2 and P3 which would otherwise exist in the absence of the limiting action of circuit 80.

The action of limiter circuit 80 assures that the minimum contrast control voltage at point P1 remains sufficiently greater than a voltage (below 4.0 volts) which would otherwise attenuate the video signal sufficiently to virtually extinguish a displayed image, particularly under low ambient light conditions. In this case, as ambient light diminishes, the action of LDR 52 would cause otherwise existing minimum contrast end point P4 to shift downward proportionally, thereby placing end point P4 at a control voltage low enough to extinguish a displayed image. This effect is illustrated by response P2'—P4', which would be produced in the absence of limiter 80 for a low ambient light condition. This effect is prevented with respect to the minimum contrast end point by the action of limiter 80, which maintains minimum contrast end point P1 at a voltage sufficient to prevent the displayed image from being extinguished.

The soft limiting action of limiter 80 produces a non-zero rate of change in limiting region P1-P3 to prevent the action of limiter 80 from being perceived by a viewer. Thus in region P1-P3 the rate of change of contrast control is less than that in non-limiting region P3-P2, but sufficient to produce small but perceptible changes in contrast in response to a viewer3 s command.

The degree of "soft" limiting produced by circuit 80 is a function of the value of the Thevenin equivalent impedance of resistors 82 and 84 relative to the effective driving source impedance at point A in FIG. 1. Nominal soft limiting, very soft limiting, or hard limiting are respectively produced when the value of such Thevenin equivalent impedance is substantially equal to, much larger than, or much smaller than the value of such driving source impedance. Both the limiting threshold and the softness of the limiting action can be adjusted by tailoring the values of resistors 82 and 84.

What is claimed is:

1. In a video signal processing system including an image displaying device having a viewing screen, apparatus comprising:

video signal processing means having a signal input for receiving a video signal, a control input for receiving a gain control signal to control the magnitude of said video signal, and an output;

first means for providing a first gain control signal;

second means for providing a second gain control signal, said second means including ambient light responsive variable conduction means positioned to receive ambient light;

means for conveying said first and second gain control signals to said control input of said video signal processing means to produce a combined gain control signal at said control input; and threshold conduction means coupled to said conveying means and responsive to said combined gain control signal for limiting the magnitude of said combined gain control signal to prevent excursions of said combined gain control signal in a direction for causing attenuation of said video signal beyond a predetermined level of said video signal.

2. In a video signal processing system including an image display device having a viewing screen, apparatus comprising:

video signal processing means having a signal input for receiving a video signal, a control input for receiving a gain control signal to control the magnitude of said video signal, and an output;

first means for providing a first gain control signal;

second means for providing a second gain control signal, said second means including ambient light responsive variable conduction means positioned to receive ambient light;

means for conveying said first and second gain control signals to said control input of said video signal processing means to produce a combined gain control signal at said control input; and threshold conduction means coupled to said conveying means for limiting the magnitude of said combined gain control signal to prevent excursions of said combined gain control signal in a direction for causing attenuation of said video signal beyond a predetermined level of said video signal; wherein said combined gain control signal exhibits a nonzero first rate of change over a first range of gain control signal mangitudes; and said threshold conduction means exhibits a limiting characteristic such that said combined gain control signal exhibits a nonzero second rate of change, less than said first rate of change, over a second range of gain control signal magnitudes when said combined gain control signal is limited by said threshold conduction means.

3. In a video signal processing system including an image display device having a viewing screen, apparatus comprising:

video signal processing means having a signal input for receiving a video signal, a control input for receiving a gain control signal to control the magnitude of said video signal, and an output;

translating means comprising digital-to-analog converter (DAC) means including means responsive to a binary signal representative of a desired magnitude of said video signal for providing an output binary signal corresponding to a first gain control signal;

second means for providing a second gain control signal, said second means including ambient light responsive variable conduction means to receive ambient light;

means for conveying said first and second gain control signals to said control input of said video signal processing means to produce a combined gain control signal at said control input; and threshold conduction means coupled to said conveying means and responsive to said combined gain control signal for limiting the magnitude of said combined gain control signal to prevent excursions of said combined gain control signal in a direction for causing attenuation of said video signal beyond a predetermined level of said video signal.

4. In a video signal processing system including an image display device having a viewing screen, apparatus comprising:

video signal processing means having a signal input for receiving a video signal, a control input for receiving a gain control signal to control the magnitude of said video signal, and an output;

translating means comprising digital-to-analog converter (DAC) means including means responsive to a binary signal representative of a desired magnitude of said video signal for providing an output binary signal corresponding to a first gain control signal;

second means for providing a second gain control signal, said second means including ambient light responsive variable conduction means to receive ambient light;

means for conveying said first and second gain control signals to said control input of said video signal processing means to produce a combined gain control signal at said control input; and threshold conduction means coupled to said conveying means for limiting the magnitude of said combined gain control signal to prevent excursions of said combined gain control signal in a direction for causing attenuation of said video signal beyond a predetermined level of said video signal; wherein said combined gain control signal exhibits a nonzero first rate of change over a first range of gain control signal magnitudes; and said threshold conduction means exhibits a limiting characteristic such that said combined gain control signal exhibits a nonzero second rate of change, less than said first rate of change, over a second range of gain control signal magnitudes when said combined gain control signal is limited by said threshold conduction means.

5. In a video signal processing system including an image display device having a viewing screen, apparatus comprising:

video signal processing means having a signal input for receiving a video signal, a control input for receiving a gain control signal to control the magnitude of said video signal, and an output;

translating means comprising digital-to-analog converter (DAC) means including means responsive to a binary signal representative of a desired magnitude of said video signal for providing an output binary signal corresponding to a first gain control signal;

second means for providing a second gain control signal, said second means including ambient light responsive variable conduction means to receive ambient light;

means for conveying said first and second gain control signals to said control input of said video signal processing means to produce a combined gain control signal at said control input; and threshold conduction means coupled to said conveying means for limiting the magnitude of said combined gain control signal to prevent excursions of said combined gain control signal in a direction for causing attenuation of said video signal beyond a predetermined level of said video signal; wherein said output binary signal being provided with a substantially constant amplitude and with a duty factor determined by said binary signal, said output binary signal corresponding to said first gain control signal.

6. Apparatus according to claim 5, wherein said translating means comprises a binary rate multiplier.

* * * * *